United States Patent
Iwami

(10) Patent No.: US 6,712,719 B2
(45) Date of Patent: Mar. 30, 2004

(54) GOLF BALL

(75) Inventor: Satoshi Iwami, Kobe (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 0 days.

(21) Appl. No.: 09/748,847

(22) Filed: Dec. 28, 2000

(65) Prior Publication Data

US 2001/0023208 A1 Sep. 20, 2001

(30) Foreign Application Priority Data

Dec. 28, 1999 (JP) .......................................... 11/373497

(51) Int. Cl.⁷ ............................................... A63B 37/06
(52) U.S. Cl. ..................................................... 473/378
(58) Field of Search .................................. 473/378, 377

(56) References Cited

U.S. PATENT DOCUMENTS

| | | | |
|---|---|---|---|
| 4,884,814 A | | 12/1989 | Sullivan |
| 5,120,791 A | * | 6/1992 | Sullivan .................... 473/378 |
| 5,324,783 A | * | 6/1994 | Sullivan .................... 473/378 |
| 5,328,959 A | * | 7/1994 | Sullivan .................... 473/378 |
| 5,542,677 A | * | 8/1996 | Sullivan et al. ...... 273/DIG. 22 |
| 5,591,803 A | * | 1/1997 | Sullivan et al. ...... 273/DIG. 22 |
| 5,631,324 A | * | 5/1997 | Rajagopalan et al. ....... 473/385 |
| 5,994,472 A | | 11/1999 | Egashira et al. |

FOREIGN PATENT DOCUMENTS

| | | |
|---|---|---|
| EP | 0490619 A1 | 9/1991 |
| GB | 2277932 | 11/1994 |
| GB | 2311293 | 9/1997 |
| JP | 1308577 | 12/1989 |
| JP | 4314463 | 11/1992 |
| JP | 53931 | 1/1993 |
| JP | 6327793 | 11/1994 |
| JP | 10248 | 1/1998 |
| JP | 10249 | 1/1998 |
| JP | 2897697 | 3/1999 |

* cited by examiner

Primary Examiner—Steven Wong
Assistant Examiner—Raeann Gorden
(74) Attorney, Agent, or Firm—Birch, Stewart, Kolasch & Birch, LLP

(57) ABSTRACT

The present invention provides a golf ball having soft and good shot feel, high rebound characteristics and excellent abrasion resistance when hit by an iron club. The present invention related to a golf ball comprising a core and at least one layer of cover covering the core, wherein the outmost layer of the cover is formed from a base resin mainly containing the mixture of (i) ethylene-(meth)acrylic acid-acrylic ester terpolymer ionomer resin obtained by neutralizing with magnesium ion, (ii) ethylene-(meth)acrylic acid copolymer ionomer resin obtained by neutralizing with sodium ion, and (iii) ethylene-(meth)acrylic acid copolymer ionomer resin obtained by neutralizing with zinc ion, and the outmost layer of the cover has a Shore D hardness of 45 to 60.

4 Claims, 1 Drawing Sheet

GOLF BALL

FIELD OF THE INVENTION

The present invention relates to a golf ball. More particularly, it relates to a golf ball having soft and good shot feel, high rebound characteristics and excellent abrasion resistance when hit by an iron club.

BACKGROUND OF THE INVENTION

Recently, ionomer resin has been widely used for cover material of golf balls. Particularly, it has been almost used for a base resin of the cover of solid golf balls, such as two-piece golf ball and three-piece golf ball. This is because the ionomer resin is superior in durability, cut resistance, rebound characteristics, etc. and it is easily processed.

However, since the ionomer resin has high hardness and rigidity, the resulting golf ball is poor in shot feel and controllability in comparison with balata (transpolyisoprene)-covered thread wound golf ball. In order to improve shot feel and controllability of the ionomer-covered golf balls, it is attempted to soften the ionomer resin by various means.

For example, Japanese Patent Kokai Publications Nos. 308577/1989, 314463/1992, 3931/1993, 327793/1994, 249/1998 and the like propose that the ionomer resin having high rigidity is mixed with ethylene-(meth)acrylic acid-acrylic ester terpolymer ionomer resin obtained by neutralizing with sodium ion, zinc ion or magnesium ion to soften it in order to improve the shot feel and controllability.

However, when the mixture of the soft ionomer resin is used, the hardness of the cover is low, and the flexural modulus of the cover is low. Thereby the rebound characteristics and flight distance of the resulting golf ball. In addition, since the cover is soft, the spin amount is high, which improves the controllability when hit by an iron club. However, since the contact area of a face surface of the golf club with golf ball is large, it is problem that the surface of the golf ball easily suffers an abrasion.

In order to solve the problem, it has been proposed to select the combination of neutralizing metal ions of the ionomer resins in the mixture of the hard ionomer resin and soft ionomer resin (for example, Japanese Patent No. 2897697, Japanese Patent Kokai Publications No. 248/1998 and the like).

In Japanese Patent No. 2897697, a golf ball, which a blend of ethylene-(meth)acrylic acid-acrylic ester terpolymer ionomer resin obtained by neutralizing with zinc ion or sodium ion and ethylene-(meth)acrylic acid copolymer ionomer resin obtained by neutralizing with magnesium ion is used as a cover material, is described. In Japanese Patent Kokai Publications No. 248/1998, a golf ball, which a blend of ethylene-(meth)acrylic acid-acrylic ester terpolymer ionomer resin obtained by neutralizing with magnesium ion and ethylene-(meth)acrylic acid copolymer ionomer resin obtained by neutralizing with magnesium ion is used as a cover material, is described. In the golf balls described in the both patent documents, the technical effects of improving the abrasion resistance and rebound characteristics, while maintaining good shot feel and controllability, by using the blend of the hard ionomer resin and the soft ionomer resin for the cover material, is obtained.

However, a golf ball, which is sufficient to improve the abrasion resistance and rebound characteristics, has been not obtained by the method of using the blend of the hard ionomer resin and the soft ionomer resin. It has been required to provide the golf ball, which the abrasion resistance and rebound characteristics are improved still more, while maintaining good shot feel and controllability.

OBJECTS OF THE INVENTION

A main object of the present invention is to provide a golf ball having soft and good shot feel, high rebound characteristics, and excellent abrasion resistance when hit by an iron club.

According to the present invention, the object described above has been accomplished, in a golf ball comprising a core and at least one layer of cover covering the core, by employing the outmost layer of the cover which is formed from three specified ionomer resins obtained by neutralizing with specified metal ions, and adjusting a Shore D hardness of the outmost layer of the cover to a specified range, thereby providing a golf ball having soft and good shot feel, high rebound characteristics, and excellent abrasion resistance when hit by an iron club.

SUMMARY OF THE INVENTION

The present invention provides a golf ball comprising a core and at least one layer of cover covering the core, wherein the outmost layer of the cover is formed from a base resin mainly containing the mixture of (i) ethylene-(meth)acrylic acid-acrylic ester terpolymer ionomer resin obtained by neutralizing with magnesium ion, (ii) ethylene-(meth)acrylic acid copolymer ionomer resin obtained by neutralizing with sodium ion, and (iii) ethylene-(meth)acrylic acid copolymer ionomer resin obtained by neutralizing with zinc ion, and the outmost layer of the cover has a Shore D hardness of 45 to 60.

In order to practice the present invention suitably, it is preferable that the ionomer resin (i) have a flexural modulus of 10 to 100 MPa, the ionomer resins (ii) and (iii) have a flexural modulus of 200 to 500 MPa and a Shore D hardness of 55 to 70, and a weight ratio [(ii)/(iii)] of the ionomer resin (ii) to the ionomer resin (iii) be within the range of 30/70 to 80/20.

The present inventors studied the type of ionomer resin used for a cover material of golf ball and the type of neutralizing metal ion of the ionomer resin in order to improve the abrasion resistance and rebound characteristics of the golf ball, which is the object of the present invention. As a result, they found that the golf ball using the ionomer resin obtained by neutralizing with sodium ion, magnesium ion or zinc ion in order is superior in rebound characteristics (sodium ion>magnesium ion>zinc ion), and the golf ball using the ionomer resin obtained by neutralizing with magnesium ion or zinc ion has good abrasion resistance, but the golf ball using the ionomer resin obtained by neutralizing with sodium ion has poor abrasion resistance, in addition to the selection of a combination of ethylene-(meth)acrylic acid-acrylic ester terpolymer ionomer resin obtained by neutralizing with metal ion and ethylene-(meth)acrylic acid copolymer ionomer resin obtained by neutralizing with metal ion.

Therefore, for example, in Japanese Patent No. 2897697 described above, from the performance of the golf ball using the ionomer resin obtained by neutralizing with magnesium ion, the rebound characteristics are degraded by blending the ionomer resin obtained by neutralizing with zinc ion, and the abrasion resistance is degraded by blending the ionomer resin obtained by neutralizing with sodium ion. In Japanese Patent Kokai Publications No. 248/1998 described above, the resulting golf ball has good abrasion resistance, but sufficient rebound characteristics are not obtained, because of blending two ionomer resins obtained by neutralizing with magnesium ion.

On the other hand, the mixture of
(i) ethylene-(meth)acrylic acid-acrylic ester terpolymer ionomer resin obtained by neutralizing with magnesium ion,
(ii) ethylene-(meth)acrylic acid copolymer ionomer resin obtained by neutralizing with sodium ion, and
(iii) ethylene-(meth)acrylic acid copolymer ionomer resin obtained by neutralizing with zinc ion is used for the cover material of the present invention. In the present invention, from the performance of the golf ball using the ionomer resin obtained by neutralizing with magnesium ion (i), insufficiency in the abrasion resistance and rebound characteristics is covered by blending the ionomer resins obtained by neutralizing with sodium ion (ii) and zinc ion (iii), and it is possible to improve only the rebound characteristics, while maintaining excellent abrasion resistance, by adjusting a weight ratio [(ii)/(iii)] of the both ionomer resins to a specified range.

Figure 1:
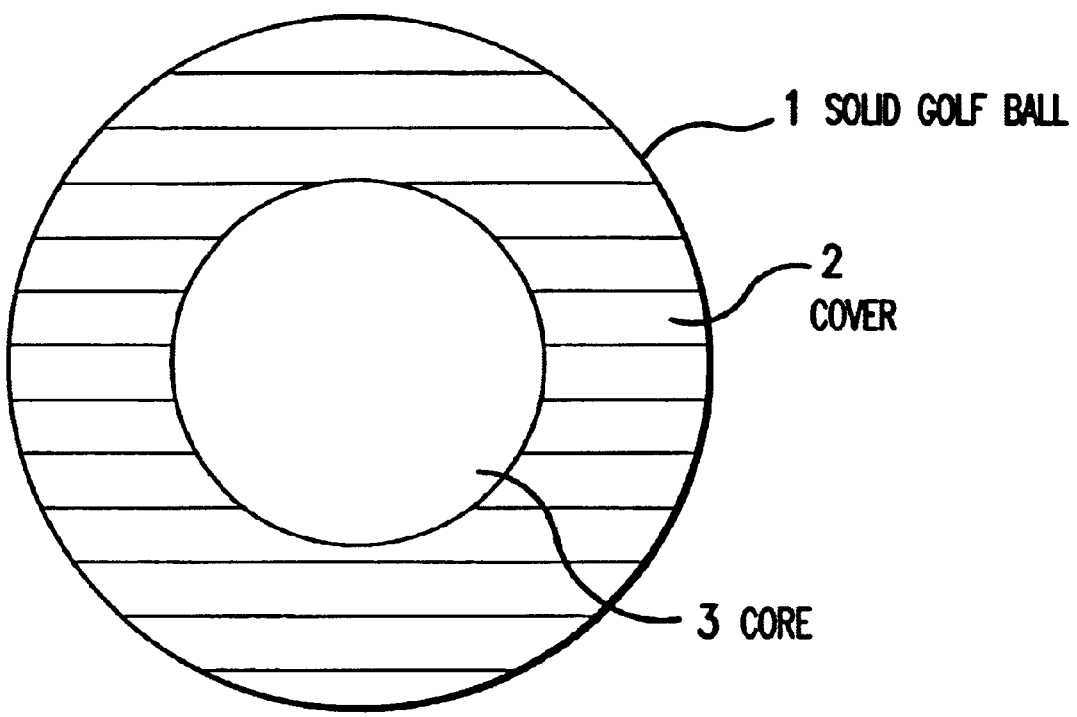
FIG. 1 is a cross-section of a two-piece golf ball made as described in this specification.

The drawing illustrates a two-piece golf ball, which has a solid core 3, and a cover 2.

DETAILED DESCRIPTION OF THE INVENTION

The golf ball of the present invention will be explained in detail hereinafter. The golf ball of the present invention comprises a core and at least one layer of cover covering the core. The core used for the golf ball of the present invention may be obtained by vulcanizing or press-molding a rubber composition in a mold. The rubber composition comprises a base rubber, a co-crosslinking agent, an organic peroxide, an organic sulfide compound, a filler, optionally an antioxidant and the like.

The base rubber can be natural rubber and/or synthetic rubber, which has been conventionally used for core of solid golf balls. Preferred is high-cis polybutadiene rubber containing not less than 40%, preferably not less than 80%, more preferably not less than 90% of a cis-1,4 bond. The polybutadiene rubber can be mixed with natural rubber, polyisoprene rubber, styrene-butadiene rubber, ethylene-propylene-diene rubber (EPDM) and the like in amount of 0 to 50 parts by weight, based on 100 parts by weight of the base rubber.

The co-crosslinking agent can be a metal salt of α,β-unsaturated carboxylic acid, including mono or divalent metal salts, such as zinc or magnesium salts of α,β-unsaturated carboxylic acids having 3 to 8 carbon atoms (e.g. acrylic acid, methacrylic acid, etc.), a functional monomer such as triethanolpropane trimethacrylate, or mixtures thereof. The preferred co-crosslinking agent is zinc acrylate because it imparts high rebound characteristics to resulting golf ball. The amount of the co-crosslinking agent is from 15 to 45 parts by weight, preferably from 20 to 35 parts by weight, more preferably from 25 to 35 parts by weight, based on 100 parts by weight of the base rubber. When the amount of the co-crosslinking agent is larger than 45 parts by weight, the core is too hard, and the shot feel of the resulting golf ball is poor. On the other hand, when the amount of the co-crosslinking agent is smaller than 15 parts by weight, the rebound characteristics are degraded.

The organic peroxide, which acts as crosslinking agent or curing agent, includes for example dicumyl peroxide, 1,1-bis(t-butylperoxy)-3,3,5-trimethylcyclohexane, 2,5-dimethyl-2,5-di(t-butylperoxy)-hexane, di-t-butyl peroxide and the like. The preferred organic peroxide is dicumyl peroxide. The amount of the organic peroxide is from 0.1 to 3.0 parts by weight, preferably from 0.3 to 2.5 parts by weight, more preferably from 0.5 to 2.0 parts by weight, based on 100 parts by weight of the base rubber. When the amount of the organic peroxide is smaller than 0.1 parts by weight, the core is too soft, and the rebound characteristics of are degraded, which reduces the flight distance. On the other hand, when the amount of the organic peroxide is larger than 3.0 parts by weight, the core is too hard, and the shot feel is poor.

The organic sulfide compound includes diphenyl polysulfides, dibenzyl polysulfides, dibenzoyl polysulfides, dibenzothiazoyl polysulfides, having 2 to 4 sulfur atoms and the like. The preferred organic sulfide compound is diphenyl disulfide, because it imparts high rebound characteristics to the resulting golf ball. The amount of the organic sulfide compound is 0.05 to 3.0 parts by weight, preferably 0.3 to 2.0 parts by weight, more preferably 0.5 to 1.0 parts by weight, based on 100 parts by weight of the polybutadiene. When the amount is smaller than 0.05 parts by weight, the technical effect accomplished by using the organic sulfide compound is sufficiently obtained. On the other hand, when the amount is larger than 3.0 parts by weight, the technical effects are not improved more.

The filler, which can be one used for a core of solid golf ball, includes for example, inorganic filler (such as zinc oxide, barium sulfate, calcium carbonate and the like), high specific gravity filler (such as tungsten powder, molybdenum powder, and the like), and the mixture thereof. The amount of the filler is from 1 to 50 parts by weight, preferably from 5 to 40, based on 100 parts by weight of the base rubber. When the amount of the filler is smaller than 1 parts by weight, it is difficult to adjust the weight of the golf ball. On the other hand, when the amount of the filler is larger than 50 parts by weight, the weight ratio of the rubber component in the core is small, and the rebound characteristics are degraded too much.

The rubber composition can contain other components which have been conventionally used for preparing the core of solid golf balls, such as antioxidant or peptizing agent. If used, the amount of the antioxidant is from 0.1 to 1.0 parts by weight, and the amount of the peptizing agent is from 0.1 to 5.0 parts by weight, based on 100 parts by weight.

The core of the golf ball of the present invention has a diameter of 36.8 to 40.8 mm, preferably 37.6 to 40.2 mm. When the diameter of the core is smaller than 36.8 mm, the cover is too thick, and the rebound characteristics are degraded. On the other hand, when the diameter is larger than 40.8 mm, the cover is too thin, and the moldability of the cover is degraded, or the durability of the cover is degraded.

The core of the golf ball of the present invention may have single layer structure or multi-layer structure which has two or more layers. In case of the single layer structure, it is preferable to accomplish high rebound characteristics and good shot feel by a vulcanized article of the rubber composition described above. In case of the multi-layer structure, it is preferable to accomplish high rebound characteristics and good shot feel by plural layers of the vulcanized article of the rubber composition, or a laminate structure of the vulcanized rubber layer and thermoplastic resin layer mainly comprising thermoplastic elastomer or ionomer.

In the present invention, at least one layer of cover is covered on the core. It is required that the outmost layer of the cover be formed from a base resin mainly containing the mixture of
- (i) ethylene-(meth)acrylic acid-acrylic ester terpolymer ionomer resin obtained by neutralizing with magnesium ion,
- (ii) ethylene-(meth)acrylic acid copolymer ionomer resin obtained by neutralizing with sodium ion, and
- (iii) ethylene-(meth)acrylic acid copolymer ionomer resin obtained by neutralizing with zinc ion.

It is desired that the ionomer resin (i) have a flexural modulus of 10 to 100 MPa, preferably 15 to 80 MPa, more preferably 25 to 55 MPa. When the flexural modulus is smaller than 10 MPa, the cover is too soft, and the rebound characteristics are degraded. On the other hand, when the flexural modulus is larger than 100 MPa, the cover is too hard, and the shot feel and controllability are degraded. It is desired that the ionomer resin (i) have a Shore D hardness of 30 to 50, preferably 35 to 45. When the Shore D hardness is smaller than 30, the cover is too soft, and the rebound characteristics are degraded. On the other hand, when the Shore D hardness is larger than 50, the cover is too hard, and the shot feel and controllability are degraded.

It is desired that both the ionomer resins (ii) and (iii) have a flexural modulus of 200 to 500 MPa, preferably 230 to 400 MPa, more preferably 270 to 300 MPa. When the flexural modulus is smaller than 200 MPa, the cover is too soft, and the rebound characteristics are degraded. On the other hand, when the flexural modulus is larger than 500 MPa, the cover is too hard, and the shot feel and controllability are degraded. It is desired that both the ionomer resins (ii) and (iii) have a Shore D hardness of 55 to 70, preferably 56 to 68, more preferably 60 to 65. When the Shore D hardness is smaller than 55, the cover is too soft, and the rebound characteristics are degraded. On the other hand, when the Shore D hardness is larger than 70, the cover is too hard, and the shot feel and controllability are degraded.

The ionomer resin is not limited, but examples thereof will be shown by a trade name thereof. Example of the ionomer resin (i) includes Surlyn 6320 (Mg), which is commercially available from Du Pont, and the like. Examples of the ionomer resin (ii), which is commercially available from Mitsui Du Pont Polychemical Co., Ltd., include Hi-milan 1555 (Na), Hi-milan 1605 (Na), Hi-milan 1707 (Na) and the like. Examples of the ionomer resin (ii), which is commercially available from Du Pont U.S.A., include Surlyn 8945 (Na), Surlyn 8140 (Na), Surlyn 8150 (Na) and the like. Examples of the ionomer resin (ii), which is commercially available from Exxon Chemical Co., include Iotek 8000 (Na), Iotek 8030 (Na) and the like. Examples of the ionomer resin (iii), which is commercially available from Mitsui Du Pont Polychemical Co., Ltd., include Hi-milan 1557 (Zn), Hi-milan 1706 (Zn) and the like. Examples of the ionomer resin (iii), which is commercially available from Du Pont U.S.A., include Surlyn 9945 (Zn), Surlyn 9120 (Zn), Surlyn 9150 (Zn) and the like. Examples of the ionomer resin (iii), which is commercially available from Exxon Chemical Co., include Iotek 7010 (Zn) and the like. Incidentally, Mg, Na and Zn, which are described in parentheses after the trade name of the above ionomer resin, indicate their neutralizing metal ion species.

The formulation ratio of the ionomer resins (i), (ii) and (iii) will be explained hereinafter. It is desired that a weight ratio [(ii)/(iii)] of the ionomer resin (ii) to the ionomer resin (iii) be within the range of 30/70 to 80/20, preferably 50/50 to 70/30. When the amount of the ionomer resin (ii) is smaller than 30% by weight, the rebound characteristics are degraded. On the other hand, when the amount of the ionomer resin (ii) is larger than 80% by weight, the abrasion resistance is degraded, and the durability at low temperature is also degraded.

It is desired that a weight ratio [(i)/(ii+iii)] of the ionomer resin (ii) to the ionomer resins (ii) and (iii) be within the range of 40/60 to 80/20, preferably 50/50 to 70/30. When the amount of the ionomer resin (i) is smaller than 40% by weight, the amount of the ionomer resin obtained by neutralizing with sodium ion is large, and the abrasion resistance is degraded. On the other hand, when the amount of the ionomer resin (ii) is larger than 80% by weight, the technical effect accomplished by using the ionomer resins obtained by neutralizing with sodium ion and zinc ion is sufficiently obtained, and it is not expectable to improve the rebound characteristics.

It is required that the outmost layer of the cover of the present invention be formed from a base resin mainly containing the mixture of the ionomer resins (i), (ii) and (iii). It is desired that the total amount of the ionomer resins (i) to (iii) be not less than 50% by weight, preferably not less than 90% by weight, more preferably 100% by weight (formed from only the ionomer resins (i), (ii) and (iii)), based on the total weight of the base resin of the outmost layer of the cover.

The cover used in the present invention may optionally contain various additives such as a pigment, a dispersant, an antioxidant, a UV absorber, a photostabilizer and a fluorescent agent or a fluorescent brightener, etc., in addition to the mixture of the ionomer resins, as long as the addition of the additives does not deteriorate the desired performance of the golf ball cover.

A method of covering the core with the cover is not specifically limited, but may be a conventional method. For example, there can be used a method comprising molding the cover composition into a semi-spherical half-shell, covering the core with the two half-shells, followed by press molding at 130 to 170° C. for 1 to 15 minutes, or a method comprising injection molding the cover composition directly on the core to cover it.

A thickness of the outmost layer of the cover is 1.0 to 3.0 mm, preferably 1.3 to 2.6 mm, more preferably 1.6 to 2.4 mm. When the thickness is smaller than 1.0 mm, it is difficult to mold the cover. When the thickness is larger than 3.0 mm, the rebound characteristics are degraded.

It is required that the outmost layer of the cover of the golf ball of the present invention have a Shore D hardness of 45 to 60, preferably 47 to 60, more preferably 47 to 58. When the cover hardness is smaller than 45, the cover is too soft, and the rebound characteristics are degraded. On the other hand, when the hardness is larger than 60, the cover is too hard, and the shot feel and controllability are degraded.

At the time of molding the cover, many depressions called "dimples" may be optionally formed on the surface of the golf ball. Furthermore, paint finishing or marking with a stamp may be optionally provided after the cover is molded for commercial purposes. The golf ball of the present invention is formed, so that it has a diameter of not less than 42.67 mm and a weight of not more than 45.93 g, according to the PGA rule.

EXAMPLES

The following Examples and Comparative Examples further illustrate the present invention in detail but are not to be construed to limit the scope thereof.

Production of Core

A rubber composition for core having the formulation shown in Table 1 was mixed, and then vulcanized by press-molding at 142° C. for 16 minutes, and then 168° C. for 8 minutes to obtain a spherical solid core having the diameter of 39.0 mm.

TABLE 1

| Core composition | Amount (parts by weight) |
|---|---|
| Polybutadiene *1 | 100 |
| Zinc acrylate | 34 |
| Zinc oxide | 16 |
| Dicumyl peroxide *2 | 1.1 |
| Antioxidant *3 | 0.5 |
| Organic sulfide compound *4 | 0.5 |

*1 Polybutadiene (trade name "BR-18") available from JSR Co., Ltd.
*2 Dicumyl peroxide available from Nippon Yushi Co., Ltd. under the trade name "Percumyl D" (Half-life period at 175° C. per minute)
*3 Trade name "Yoshinox 425" from Yoshitomi Pharmaceutical Ind., Ltd.
*4 Diphenyl disulfide available from Sumitomo Seika Co., Ltd.

Preparation of Cover Composition

The materials for cover shown in Tables 2 and 3 were extruded using a kneading type twin-screw extruder to obtain pelletized cover compositions. The extrusion condition was, a screw diameter of 45 mm, a screw speed of 200 rpm, and a screw L/D of 35.

The formulation materials were heated at 200 to 260° C. at the die position of the extruder. The Shore D hardness and flexural modulus of the resulting cover composition were measured, and the results are shown in the same Tables.

TABLE 2

| Cover composition | (parts by weight) Example No. | | | | | |
|---|---|---|---|---|---|---|
| | 1 | 2 | 3 | 4 | 5 | 6 |
| Surlyn 6320 *5 | 80 | 70 | 60 | 50 | 30 | 20 |
| Surlyn 8320 *6 | — | — | — | — | — | — |
| Surlyn 9320 *7 | — | — | — | — | — | — |
| Hi-milan 1605 *8 | 10 | 20 | 20 | 30 | 40 | 40 |
| Hi-milan 1706 *9 | 10 | 10 | 20 | 20 | 30 | 40 |
| Hi-milan AM7311 *10 | — | — | — | — | — | — |
| Surlyn 7930 *11 | — | — | — | — | — | — |
| Na/Zn | 1 | 2 | 1 | 1.5 | 1.3 | 1 |

TABLE 3

| Cover composition | (parts by weight) Comparative Example No. | | | | | | | |
|---|---|---|---|---|---|---|---|---|
| | 1 | 2 | 3 | 4 | 5 | 6 | 7 | 8 |
| Surlyn 6320 *5 | 100 | 50 | 50 | 50 | — | — | — | 50 |
| Surlyn 8320 *6 | — | — | — | — | 50 | 50 | — | — |
| Surlyn 9320 *7 | — | — | — | — | — | — | 50 | — |
| Hi-milan 1605 *8 | — | 50 | — | — | 30 | — | 30 | — |
| Hi-milan 1706 *9 | — | — | — | — | 20 | 50 | 20 | 50 |
| Hi-milan AM7311 *10 | — | — | 50 | — | — | — | — | — |
| Surlyn 7930 *11 | — | — | — | 50 | — | — | — | — |
| Na/Zn | — | — | — | — | 1.5 | — | 1.5 | — |

*5 Surlyn 6320 (trade name), ethylene-methacrylic acid - n-butyl acrylate terpolymer ionomer resin obtained by neutralizing with magnesium ion, manufactured by Du Pont Co., flexural modulus = 53 MPa, Shore D hardness = 44
*6 Surlyn 8320, ethylene-methacrylic acid - n-butyl acrylate terpolymer ionomer resin obtained by neutralizing with sodium ion, manufactured by Du Pont Co., flexural modulus = 30 MPa, Shore D hardness = 35
*7 Surlyn 9320, ethylene-methacrylic acid - n-butyl acrylate terpolymer ionomer resin obtained by neutralizing with zinc ion, manufactured by Du Pont Co., flexural modulus = 25 MPa, Shore D hardness = 40
*8 Hi-milan 1605 (trade name), ethylene-methacrylic acid copolymer ionomer resin obtained by neutralizing with sodium ion, manufactured by Mitsui Du Pont Polychemical Co., Ltd., flexural modulus = 295 MPa, Shore D hardness = 61
*9 Hi-milan 1706 (trade name), ethylene-methacrylic acid copolymer ionomer resin obtained by neutralizing with zinc ion, manufactured by Mitsui Du Pont Polychemical Co., Ltd., flexural modulus = 270 MPa, Shore D hardness = 60
*10 Hi-milan AM7311 (trade name), ethylene-methacrylic acid copolymer ionomer resin obtained by neutralizing with magnesium ion, manufactured by Mitsui Du Pont Polychemical Co., Ltd., flexural modulus = 274 MPa, Shore D hardness = 63
*11 Surlyn 7930 (trade name), ethylene-methacrylic acid copolymer ionomer resin obtained by neutralizing with lithium ion, manufactured by Du Pont Co., flexural modulus = 340 MPa, Shore D hardness = 63

Examples 1 to 6 and Comparative Examples 1 to 8

The solid core obtained above was directly covered by injection molding the cover composition to form a cove layer having a thickness of 1.9 mm. Then paint was applied on the surface to produce golf balls having a diameter of 42.8 mm. With respect to the resulting golf balls, the coefficient of restitution and abrasion resistance when hit by an iron club were measured or evaluated, and the results were shown in Table 4 and Table 5. The test method is as follows.

Test Method (1) Shore D Hardness

The Shore D hardness of the cover was measured with a Shore D hardness meter according to ASTM D-2240-68, using a sample of a stack of three or more heat and press molded sheet having a thickness of about 2 mm from each cover composition, which had been stored at 23° C. for 2 weeks.

(2) Flexural Modulus (Flexural Stiffness)

The flexural modulus (flexural stiffness) was determined according to JIS K 7106, using a sample of a heat and press molded sheet having a thickness of about 2 mm from each cover composition, which had been stored at 23° C. for 2 weeks.

(3) Coefficient of Restitution

An aluminum cylinder having weight of 200 g was struck at a speed of 45 m/sec against a golf ball, and the velocity of the cylinder and the golf ball before and after the strike were measured. The coefficient of restitution of the golf ball was calculated from the velocity and the weight of both the cylinder and the golf ball. The measurement was conducted 5 times for each golf ball, and the average is shown as the coefficient of restitution of the golf ball, which is indicated by an index when that of Example 1 is 100.

(4) Abrasion Resistance

After a pitching wedge having a face of pure titanium (PW, available from Dunlop Co. under trade name "HIBRID AUTOFOCUS") was mounted to a swing robot manufactured by True Temper Co. and three points on the surface of each golf ball was hit. The three points were evaluated by examining the surface appearance by visual check. The evaluation criteria are as follows.

Evaluation Criteria

∘: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

Test Results

TABLE 4

| Test item | Example No. | | | | | |
|---|---|---|---|---|---|---|
| | 1 | 2 | 3 | 4 | 5 | 6 |
| (Cover) | | | | | | |
| Shore D hardness | 47 | 49 | 52 | 54 | 57 | 59 |
| Flexural modulus (MPa) | 100 | 120 | 145 | 170 | 215 | 240 |
| (Golf ball) | | | | | | |
| Coefficient of restitution | 100 | 101 | 102 | 102 | 105 | 106 |
| Abrasion resistance | ∘ | ∘ | ∘ | ∘ | ∘ | ∘ |

TABLE 5

| Test item | Comparative Example No. | | | | | | | |
|---|---|---|---|---|---|---|---|---|
| | 1 | 2 | 3 | 4 | 5 | 6 | 7 | 8 |
| (Cover) | | | | | | | | |
| Shore D hardness | 44 | 54 | 54 | 55 | 53 | 51 | 52 | 55 |
| Flexural modulus (MPa) | 53 | 170 | 160 | 195 | 155 | 150 | 155 | 160 |
| (Golf ball) | | | | | | | | |
| Coefficient of restitution | 95 | 101 | 101 | 101 | 98 | 97 | 97 | 97 |
| Abrasion resistance | x | x | Δ | x | x | x | x | Δ |

As is apparent from the above results shown in Tables 4 and 5, the golf balls of the present invention of Examples 1 to 6, which are compared with the golf balls of Comparative Examples 1 to 8, have high coefficient of restitution and excellent abrasion resistance at approach shot.

On the other hand, in the golf ball of Comparative Example 1, the cover material is formed from only terpolymer ionomer resin obtained by neutralizing with magnesium ion, and the cover is too soft, which reduces the coefficient of restitution and abrasion resistance.

In the golf ball of Comparative Example 2, the cover material is formed from only copolymer ionomer resin obtained by neutralizing with sodium ion, in addition to terpolymer ionomer resin obtained by neutralizing with magnesium ion, and the coefficient of restitution is as good as the golf balls of Examples, but the abrasion resistance is degraded.

In the golf ball of Comparative Example 3, the cover material is formed from terpolymer ionomer resin obtained by neutralizing with magnesium ion and copolymer ionomer resin obtained by neutralizing with magnesium ion, and both the coefficient of restitution and abrasion resistance are good in the golf balls of Comparative Examples, but are poor when compared with the golf balls of Examples.

In the golf ball of Comparative Example 4, the cover material is formed from only copolymer ionomer resin obtained by neutralizing with lithium ion, in addition to terpolymer ionomer resin obtained by neutralizing with magnesium ion, and the coefficient of restitution is as good as the golf balls of Examples, but the abrasion resistance is degraded.

In the golf ball of Comparative Example 5, the cover material is formed from terpolymer ionomer resin obtained by neutralizing with sodium ion, in addition to copolymer ionomer resin obtained by neutralizing with sodium ion and copolymer ionomer resin obtained by neutralizing with zinc ion, and the coefficient of restitution is low and the abrasion resistance is poor.

In the golf ball of Comparative Example 6, the cover material is formed from terpolymer ionomer resin obtained by neutralizing with sodium ion and copolymer ionomer resin obtained by neutralizing with only zinc ion, and the coefficient of restitution is low and the abrasion resistance is poor.

In the golf ball of Comparative Example 7, the cover material is formed from terpolymer ionomer resin obtained by neutralizing with zinc ion, in addition to copolymer ionomer resin obtained by neutralizing with sodium ion and copolymer ionomer resin obtained by neutralizing with zinc ion, and the coefficient of restitution is low and the abrasion resistance is poor.

In the golf ball of Comparative Example 8, the cover material is formed from only copolymer ionomer resin obtained by neutralizing with zinc ion, in addition to terpolymer ionomer resin obtained by neutralizing with magnesium ion, and the abrasion resistance is good in the golf balls of Comparative Examples, but is poor when compared with the golf balls of Examples. In addition, the coefficient of restitution is low.

What is claimed is:

1. A golf ball comprising a core and at least one layer of cover covering the core, wherein the outmost layer of the cover is formed from a base resin mainly containing the mixture of (i) ethylene-(meth)acrylic acid-acrylic ester terpolymer ionomer resin obtained by neutralizing with magnesium ion, (ii) ethylene-(meth)acrylic acid-acrylic copolymer ionomer resin obtained by neutralizing with sodium ion, and (iii) ethylene-(meth)acrylic acid copolymer ionomer resin obtained by neutralizing with zinc ion, and the outmost layer of the cover has a Shore D hardness of 47 to 58.

2. The golf ball according to claim 1, wherein the ionomer resin (i) has a flexural modulus of 10 to 100 MPa.

3. The golf ball according to claim 1, wherein the ionomer resins (ii) and (iii) have a flexural modulus of 200 to 500 MPa and a Shore D hardness of 55 to 70.

4. The golf ball according to claim 1, wherein a weight ratio of [(ii)/(iii)] of the ionomer resin (ii) to the ionomer resin (iii) is within the range of 30/70 to 70/30.

* * * * *